United States Patent
Shao et al.

(10) Patent No.: US 10,357,818 B2
(45) Date of Patent: Jul. 23, 2019

(54) REUSABLE CASTING HEAD DEVICE

(71) Applicant: Wuxi Lihu Corporation Limited, Jiangsu (CN)

(72) Inventors: Hong Shao, Jiangsu (CN); Xinxiao Lu, Jiangsu (CN); Zhen Zhu, Jiangsu (CN)

(73) Assignee: WUXI LIHU CORPORATION LIMITED, Wuxi, Jiangsu (CN)

( * ) Notice: Subject to any disclaimer, the term of this patent is extended or adjusted under 35 U.S.C. 154(b) by 158 days.

(21) Appl. No.: 15/563,708

(22) PCT Filed: Mar. 28, 2016

(86) PCT No.: PCT/CN2016/077471
§ 371 (c)(1),
(2) Date: Oct. 2, 2017

(87) PCT Pub. No.: WO2016/155588
PCT Pub. Date: Oct. 6, 2016

(65) Prior Publication Data
US 2018/0071815 A1 Mar. 15, 2018

(30) Foreign Application Priority Data
Apr. 1, 2015 (CN) .......................... 2015 1 0166934

(51) Int. Cl.
*B22C 9/08* (2006.01)
*B22D 41/005* (2006.01)
*B29C 39/38* (2006.01)

(52) U.S. Cl.
CPC .............. *B22C 9/08* (2013.01); *B22D 41/005* (2013.01); *B29C 39/38* (2013.01)

(58) Field of Classification Search
CPC ...... B29C 39/38; B22D 41/01; B22D 41/015; B22D 41/005; B22C 9/08; B22C 9/088
(Continued)

(56) References Cited

U.S. PATENT DOCUMENTS 1,366,135 A * 1/1921 Speirs .................... B22D 41/01
219/421
1,425,658 A * 8/1922 Jamison ................... B22D 7/00
249/200
(Continued)

FOREIGN PATENT DOCUMENTS

CN 202137332 U 2/2012
CN 103394649 A 11/2013
(Continued)

*Primary Examiner* — Joseph S Del Sole
*Assistant Examiner* — Emmanuel S Luk
(74) *Attorney, Agent, or Firm* — Muncy, Geissler, Olds & Lowe, P.C.

(57) ABSTRACT

A reusable casting head device comprises a casting head control mechanism, a casting head mechanism and a temperature control mechanism. A gate of the casting head is sealed by the gate holder to allow that initially heated molten aluminum is rapidly heated in the casting head, thus improving efficiency; the casting head made of beryllium copper is heated and maintained by the high-frequency heating ring, thus providing a high accuracy of temperature measurement and control; and the rotating cylinder, the positioning cylinder and the reverse rotating cylinder are employed for procedure operation to intelligentize the casting operation, thus providing low production cost.

1 Claim, 2 Drawing Sheets

(58) Field of Classification Search
USPC .................................. 249/201, 106, 197, 200
See application file for complete search history.

(56) References Cited

U.S. PATENT DOCUMENTS

| | | | | |
|---|---|---|---|---|
| 1,429,251 | A * | 9/1922 | Peyton ..................... | B22D 7/10 249/106 |
| 1,771,114 | A * | 7/1930 | Fry ........................ | B22D 41/01 164/335 |
| 1,789,883 | A * | 1/1931 | Roth ...................... | B22D 27/06 164/338.1 |
| 2,215,733 | A * | 9/1940 | Gibb ...................... | B29C 37/006 264/327 |
| 2,920,353 | A * | 1/1960 | Strating ................ | B29B 13/022 164/128 |
| 3,000,759 | A * | 9/1961 | Barsky .................. | B29C 31/047 118/600 |
| 3,231,948 | A * | 2/1966 | Dempsey ............... | B22D 7/108 118/408 |
| 3,239,187 | A * | 3/1966 | Daley ..................... | B22D 7/10 249/197 |
| 3,547,182 | A * | 12/1970 | Roelofs ................ | B22D 11/142 164/416 |
| 3,752,435 | A * | 8/1973 | Daussan ................ | B22D 7/106 249/106 |
| 3,820,587 | A * | 6/1974 | Plockinger et al. ... | B22D 27/06 164/515 |
| 3,975,200 | A * | 8/1976 | Takashima ............... | B22D 7/10 106/38.22 |
| 4,042,206 | A * | 8/1977 | Matsuyama ............. | B22D 7/10 106/38.2 |
| 4,138,096 | A * | 2/1979 | Boucher ................. | F27B 14/08 266/240 |
| 4,157,110 | A * | 6/1979 | Plockinger ............. | B22D 27/06 164/497 |
| 4,238,671 | A | 12/1980 | Gellert | |
| 4,352,482 | A * | 10/1982 | Duvall ................... | B22D 7/106 249/106 |
| 4,721,278 | A * | 1/1988 | Vallak ................... | B22D 7/106 249/106 |
| 2008/0169080 | A1* | 7/2008 | Lellig .................... | B22C 9/088 164/155.2 |
| 2015/0352635 | A1* | 12/2015 | Eriksson ................ | B22D 1/00 75/382 |
| 2016/0107226 | A1* | 4/2016 | Piskorski ............. | C21C 7/0025 164/473 |

FOREIGN PATENT DOCUMENTS

| | | |
|---|---|---|
| CN | 203409192 U | 1/2014 |
| CN | 203862962 U | 10/2014 |
| CN | 104722714 A | 6/2015 |
| CN | 104722744 A | 6/2015 |
| CN | 204486769 U | 7/2015 |
| CN | 204504150 U | 7/2015 |

* cited by examiner

REUSABLE CASTING HEAD DEVICE

FIELD OF THE INVENTION

The invention relates to the field of aluminum alloy casting, and particularly to a reusable casting head device used when a compressor housing of a supercharger is cast.

BACKGROUND OF THE INVENTION

For energy saving and emission reduction, various types of automobiles are additionally equipped with superchargers, and the demand is ever-increasing, but a casting head used during casting of a compressor housing is made of a disposable coated sand article such that corresponding equipment, manpower, materials and electric power are equipped therefor and a lot of sites are also occupied, thus causing high energy consumption, large waste and pollution.

SUMMARY OF THE INVENTION

In view of the above problems, the utility model provides a reusable casting head device for cost saving.

According to a technical solution of the invention, a reusable casting head device comprises a casting head control mechanism, a casting head mechanism and a temperature control mechanism.

The casting head control mechanism is arranged at one side of a gravity casting machine 1 and provided with a rotating cylinder 19 and a gate holder 18, a positioning cylinder 14 is arranged on the rotating cylinder 19, and a reverse rotating cylinder 11 is arranged on the positioning cylinder 14; the casting head mechanism, a heating ring bracket 10 and a lower heating ring bracket are arranged at a front end of the reverse rotating cylinder 11; a power input connector 9 and an input cable 12 are arranged at a front end of the heating ring bracket 10; a cooling water outlet pipe 7 of a heating ring 3 is arranged at a front end of the power input connector 9; and a loop connector 8 and a loop cable 13 are arranged at a front end of the lower heating ring bracket, and a cooling water inlet pipe 6 is arranged at a front end of the loop connector 8.

The casting head mechanism is provided with a casting head clamping frame 5 and a reusable casting head 2 is arranged in the casting head clamping frame 5.

The temperature control mechanism is provided with the heating ring 3 below the casting head, a temperature probe 4 is arranged at a junction between the casting head 2 and the casting head clamping frame 5, a high-frequency heater 17 is arranged nearby the casting machine, and a cabinet output connector 15 and a cabinet loop connector 16 are arranged on the high-frequency heater 17.

The casting head 2 is made of beryllium copper and internally provided with casting coating.

The invention has the following technical effects: a reusable casting head device is made of beryllium copper and internally provided with casting coating to replace an original coated sand casting head, and therefore can be reused; a gate of the casting head is sealed by the gate holder 18 to allow that initially heated molten aluminum is rapidly heated in the casting head, thus improving efficiency; the casting head made of beryllium copper is heated and maintained by the high-frequency heating ring 3, thus providing rapid temperature sensing, uniform heat conduction and a high accuracy of temperature measurement and control; the rotating cylinder 19, the positioning cylinder 14 and the reverse rotating cylinder 11 arranged at one side of the gravity casting machine 1 are employed to perform procedure operation on the reusable casting head to replace manual operation, thus intelligentizing and mechanizing the casting operation; and a small high-frequency heater is used as a heating and temperature control source of the casting head, which not only saves energy, but also provides high efficiency and low production cost.

DETAILED DESCRIPTION OF THE INVENTION

Particular embodiments of the invention will be further described below with reference to the drawings.

Figure 1:
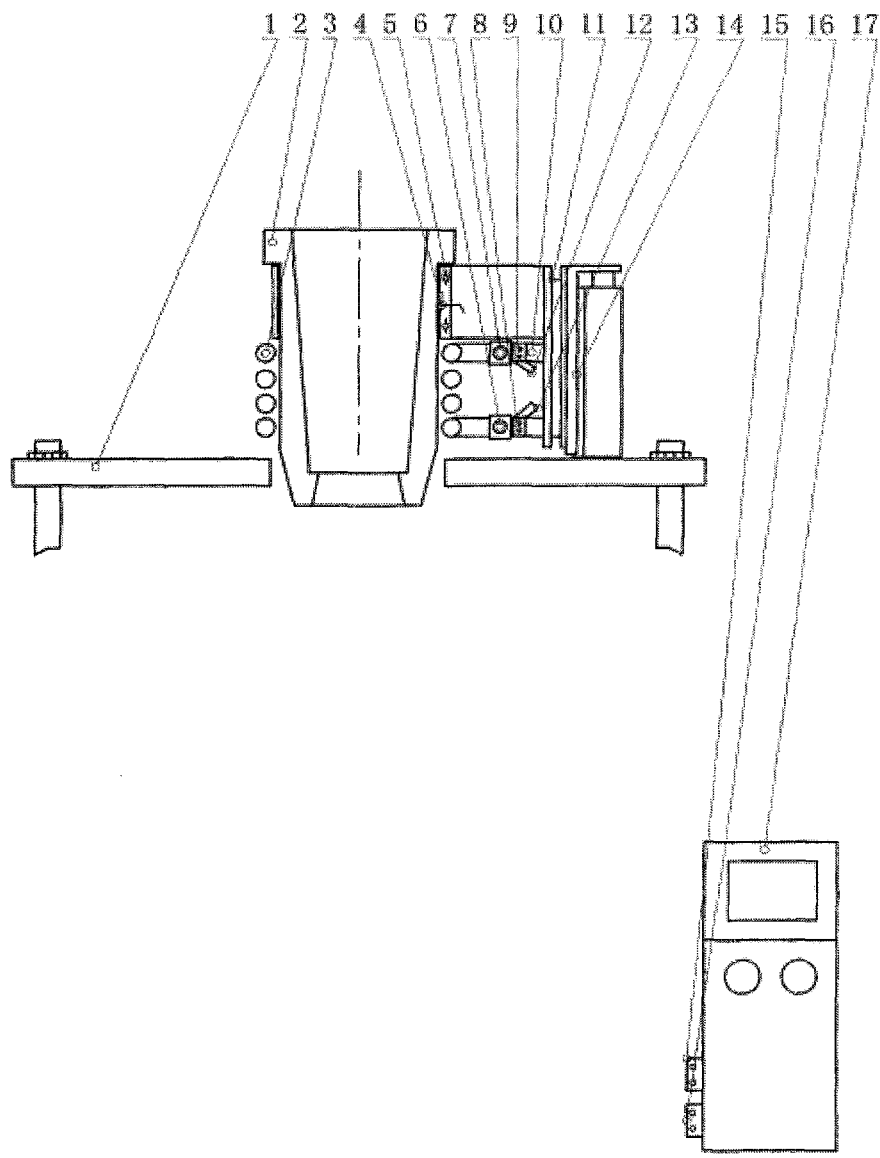
FIG. 1 is a schematic structural view of the invention.
Figure 2:
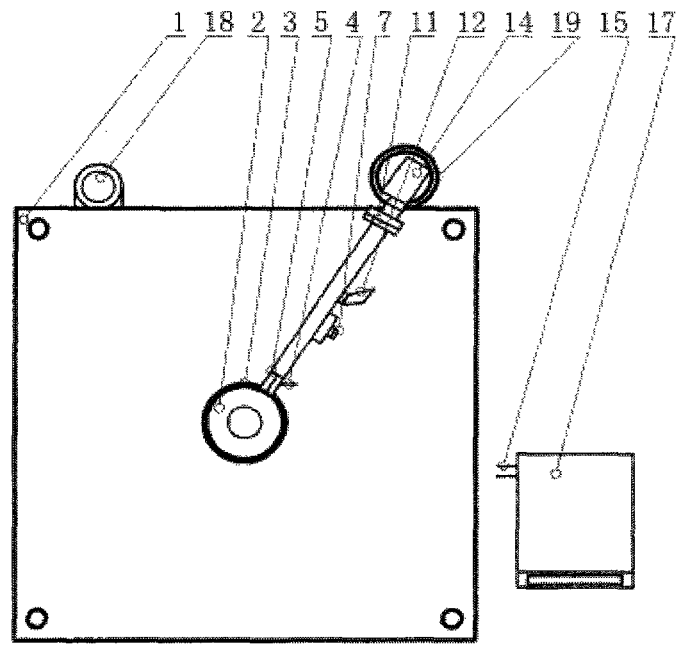
FIG. 2 is a top view of FIG. 1.
Figure 3:
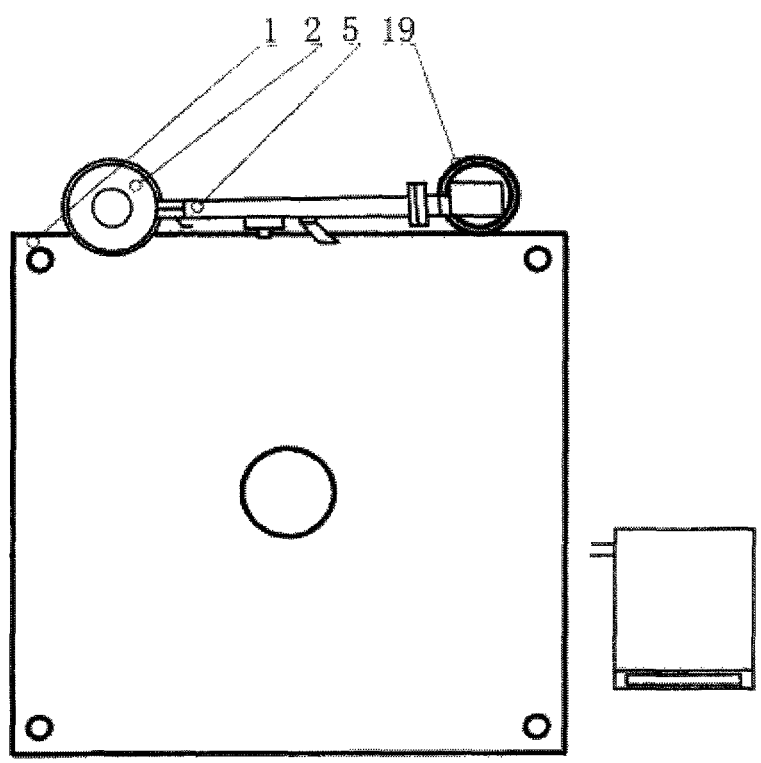
FIG. 3 is a top view of a reusable casting head sealed by a gate holder 18 upon initial heating.

In FIGS. 1, 2 and 3, a reusable casting head device comprises a casting machine 1, a casting head 2, a heating ring 3, a temperature probe 4, a casting head clamping frame 5, a water inlet pipe 6, a water outlet pipe 77, a loop connector 8, a power input connector 9, a heating ring bracket 10, a reverse rotating cylinder 11, an input cable 12, a loop cable 13, a positioning cylinder 14, a cabinet output connector 15, a cabinet loop connector 16, a high-frequency heater 17, a gate holder 18, a rotating cylinder 19 and the like.

As shown in FIGS. 1, 2 and 3, the invention provides a reusable casting head device which comprises a casting head control mechanism, a casting head mechanism and a temperature control mechanism.

The casting head control mechanism comprises a gravity casting machine 1, a rotating cylinder 19, a gate holder 18, a positioning cylinder 14, a reverse rotating cylinder 11, a power input connector 9, an input cable 12, a cooling water outlet pipe 7, a loop connector 8, a loop cable 13 and a cooling water inlet pipe 6; the rotating cylinder 19 and the gate holder 18 of the casting head control mechanism are arranged at one side of the gravity casting machine 1, the positioning cylinder 14 is arranged on the rotating cylinder 19, and the reverse rotating cylinder 11 is connected to the positioning cylinder 14; the casting head mechanism, a heating ring bracket 10 and a lower heating ring bracket are connected to a front end of the reverse rotating cylinder 11; the power input connector 9 and the input cable 12 are arranged at a front end of the heating ring bracket 10; the cooling water outlet pipe 7 of a heating ring 3 is arranged at a front end of the power input connector 9; and the loop connector 8 and the loop cable 13 are arranged at a front end of the lower heating ring bracket, and the cooling water inlet pipe 6 is arranged at a front end of the loop connector 8. The casting head mechanism comprises a casting head clamping frame 5 and a casting head 2; and the casting head 2 is arranged in the casting head clamping frame 5.

The temperature control mechanism comprises a heating ring 3, a temperature probe 4, a high-frequency heater 17, a cabinet output connector 15 and a cabinet loop connector 16; the heating ring 3 is arranged below the casting head 2, and two ends of the heating ring are respectively connected to the power input connector 9 and the loop connector 8; and the temperature probe 4 is arranged at a junction between the casting head 2 and the casting head clamping frame 5, the high-frequency heater 17 is arranged nearby the casting machine, and the cabinet output connector 15 and the cabinet loop connector 16 are arranged on the high-frequency heater 17.

The casting head 2 is made of beryllium copper and internally provided with casting coating.

A reusable casting head device according to the invention is made of beryllium copper and internally applied with casting coating to replace an original coated sand casting head; a gate of the casting head is sealed by the gate holder 18 to allow that initially heated molten aluminum is rapidly heated in the casting head; the rotating cylinder 19, the positioning cylinder 14 and the reverse rotating cylinder 11 arranged at one side of the gravity casting machine 1 are employed to perform procedure operation on the reusable casting head to replace manual operation, thus intelligentizing and mechanizing the casting operation; and a small high-frequency heater is used as a heating and temperature control source of the casting head, which not only saves energy, but also provides high efficiency and low production cost.

The invention claimed is:

1. A reusable casting head device, comprising a casting head control mechanism, a casting head mechanism and a temperature control mechanism;

the casting head control mechanism being arranged at one side of a gravity casting machine (1) and provided with a rotating cylinder (19) and a gate holder (18), a positioning cylinder (14) being arranged on the rotating cylinder (19), and a reverse rotating cylinder (11) being arranged on the positioning cylinder (14); the casting head mechanism, a heating ring bracket (10) and a lower heating ring bracket being arranged at a front end of the reverse rotating cylinder (11); a power input connector (9) and an input cable (12) being arranged at a front end of the heating ring bracket (10); a cooling water outlet pipe (7) of a heating ring (3) being arranged at a front end of the power input connector (9); and a loop connector (8) and a loop cable (13) being arranged at a front end of the lower heating ring bracket, and a cooling water inlet pipe (6) being arranged at a front end of the loop connector (8);

the casting head mechanism being provided with a casting head clamping frame (5) and a casting head (2) being arranged in the casting head clamping frame (5);

the temperature control mechanism being provided with the heating ring (3) below the casting head, a temperature probe (4) being arranged at a junction between the casting head (2) and the casting head clamping frame (5), a high-frequency heater (17) being arranged nearby the gravity casting machine, and a cabinet output connector (15) and a cabinet loop connector (16) being arranged on the high-frequency heater (17); and the casting head (2) being made of beryllium copper and internally provided with casting coating.

* * * * *